United States Patent [19]
Yumiyama et al.

[11] Patent Number: 5,969,458
[45] Date of Patent: Oct. 19, 1999

[54] PERMANENT MAGNETIC FIELD STARTER MOTOR

[75] Inventors: Shigeru Yumiyama; Naoki Sumiya; Atsushi Saeki, all of Hitachinaka; Akira Toba, Naka-machi, all of Japan

[73] Assignee: Hitachi, Ltd., Japan

[21] Appl. No.: 09/095,697

[22] Filed: Jun. 11, 1998

[30] Foreign Application Priority Data

Jun. 11, 1997 [JP] Japan .................................. 9-154090

[51] Int. Cl.$^6$ .............................................. H01R 39/38
[52] U.S. Cl. ............................................................ 310/239
[58] Field of Search ................................... 310/239, 238, 310/242, 235

[56] References Cited

U.S. PATENT DOCUMENTS

| | | | |
|---|---|---|---|
| 4,694,214 | 9/1987 | Stewart, Sr. .............................. | 310/239 |
| 5,006,747 | 4/1991 | Stewart, Sr. .............................. | 310/239 |
| 5,113,104 | 5/1992 | Blaettner et al. ......................... | 310/90 |
| 5,159,222 | 10/1992 | Southall ................................... | 310/239 |
| 5,610,467 | 3/1997 | Shiah et al. .............................. | 310/329 |

*Primary Examiner*—Thomas M. Dougherty
*Assistant Examiner*—Joseph Waks
*Attorney, Agent, or Firm*—Evenson, McKeown, Edwards & Lenahan, P.L.L.C.

[57] ABSTRACT

In a permanent magnet field starter motor, a ring shaped enlarged portion is formed at an end of a yoke and has an inner diameter Da which is larger than an inner diameter of the yoke. The inner diameter Da of the enlarged portion is at least as large as an outer diameter Db of a brush member holder plate which is inserted to an inner side of the enlarged portion, so that the radial position between the yoke and the brush member holder plate is directly aligned. A cut-out groove is formed on the yoke for inserting a bush member. The bush member is inserted into the cut-out groove, so that a thrust direction position of an outside portion lead wire, a lead terminal, and a lead wire is determined. A projection formed on the brush member holder plate has a width Wb which is at least as large as the width Wa of the cut-out groove. By inserting projection into the cut-out groove, the circumferential position between the yoke and the brush member holder plate is aligned.

6 Claims, 3 Drawing Sheets

PERMANENT MAGNETIC FIELD STARTER MOTOR

BACKGROUND OF THE INVENTION

The present invention relates to a permanent magnetic field starter motor in which permanent magnets are used as a magnetic field and in particular to a permanent magnetic field starter motor having improved position alignment accuracy between permanent magnets and a brush member.

In a permanent magnetic field starter motor according to the prior art, first of all permanent magnets are arranged an inner peripheral face of a yoke. Next, a brush member is arranged on a brush member holder plate and the brush member holder plate is aligned in position and fixed to a rear bracket using screw members. After that, by aligning the rear bracket (to which the brush member holder plate is fixed) and the yoke (to which the permanent magnets are arranged,) the permanent magnets and the brush member are aligned in position.

As the techniques relating to the above stated kinds of the permanent magnetic field starter motor apparatus are disclosed in, for example Japanese patent laid-open publication No. Sho 64-77,446, Japanese patent laid-open publication No. Hei 7-123,628 and Japanese patent laid-open publication No. Hei 6-284,626.

However, in these conventional permanent magnetic field starter motor techniques, arrangement of the permanent magnets and the brush member at a predetermined position (such as between the permanent magnets and the yoke; the yoke and the rear bracket; the rear bracket and the brush member holder plate; and the brush member holder plate and the brush member) requires three components (the yoke, the rear bracket, and the brush member holder plate) in addition to the permanent magnets and the brush member. Further, to arrange the permanent magnets and the brush member at the predetermined position, four positioning alignments are required.

Positioning alignment errors between the respective components affect the positioning accuracy between the permanent magnets and the brush member. As a result, the position of the brush member against the permanent magnets slips off, so that a desirable performance of the permanent magnetic field starter motor can not obtained.

When positioning accuracy between the respective components is increased, the above stated problem would be resolved; however, the manufacturing cost of the permanent magnetic field starter motor becomes high, and as a result the price of the permanent magnetic field starter motor also becomes high.

SUMMARY OF THE INVENTION

An object of the present invention is to realize a permanent magnetic field starter motor wherein without a rise of the manufacturing cost of the permanent magnetic field starter motor, positioning alignment accuracy between permanent magnets and a brush member can be improved.

(1) In the present invention, to attain the above stated object, a permanent magnetic field starter motor has a plurality of permanent magnets which are positioning aligned and arranged at an inner peripheral face of a cylindrical shaped yoke, and plus and minus side brush members are positioned and arranged on a disc shaped brush member holder plate. At an end portion of the yoke adjacent the brush member holder plate, an enlarged portion is formed, which has an inner diameter that is larger than an outer diameter of the brush member holder plate. At the end portion of the yoke adjacent the brush member holder plate, a cut-out groove is formed, and a radial projection is formed on the brush member holder plate. The brush member holder plate is arranged at the inner periphery of the enlarged portion, and the projection of said brush member holder plate is inserted into the cut-out groove. This arrangement permits positioning alignment in a circumferential direction between the permanent magnets and said brush member, and positioning alignment in a radial direction between the permanent magnets and said brush member.

Preferably, in the above embodiment, a lead wire of the plus side brush member is arranged to pass through the cut-out groove, and the dimensional relationship between the width (Wa) of the cut-out groove and the width (Wb) of the projection is formed to have $Wa \geq Wb$.

In addition, at a central portion of the brush member holder plate, a penetrating hole is preferably provided in which a rotatable shaft of an armature is formed. A bearing member supports the rotatable shaft which is inserted into said penetrating hole and further intervening said brush member holder plate, a rear bracket which is installed to an end portion of said yoke is provided.

Since the brush member holder plate is arranged directly at an inner side of an enlarged portion which is formed at an end portion of the yoke, the error factor in a positioning alignment which intervenes between the permanent magnets and the brush member can be reduced. As a result, circumferential positioning alignment between the permanent magnets and the brush member can be improved.

Further, since the projection is inserted into the cut-out groove which is originally necessary to accommodate the lead wire, radial positioning alignment between said permanent magnets and said brush member can be improved.

Thus, without a rise in a manufacturing cost of the permanent magnetic field starter motor, the error factor in circumferential positioning alignment between the permanent magnets and the brush member can be reduced. Also, the radial positioning alignment between the permanent magnets and the brush member can be improved.

Other objects, advantages and novel features of the present invention will become apparent from the following detailed description of the invention when considered in conjunction with the accompanying drawings.

DESCRIPTION OF THE INVENTION

Hereinafter, one embodiment of a permanent magnetic field starter motor according to the present invention will be explained referring to FIGS. 1 through 5.

Figure 1:
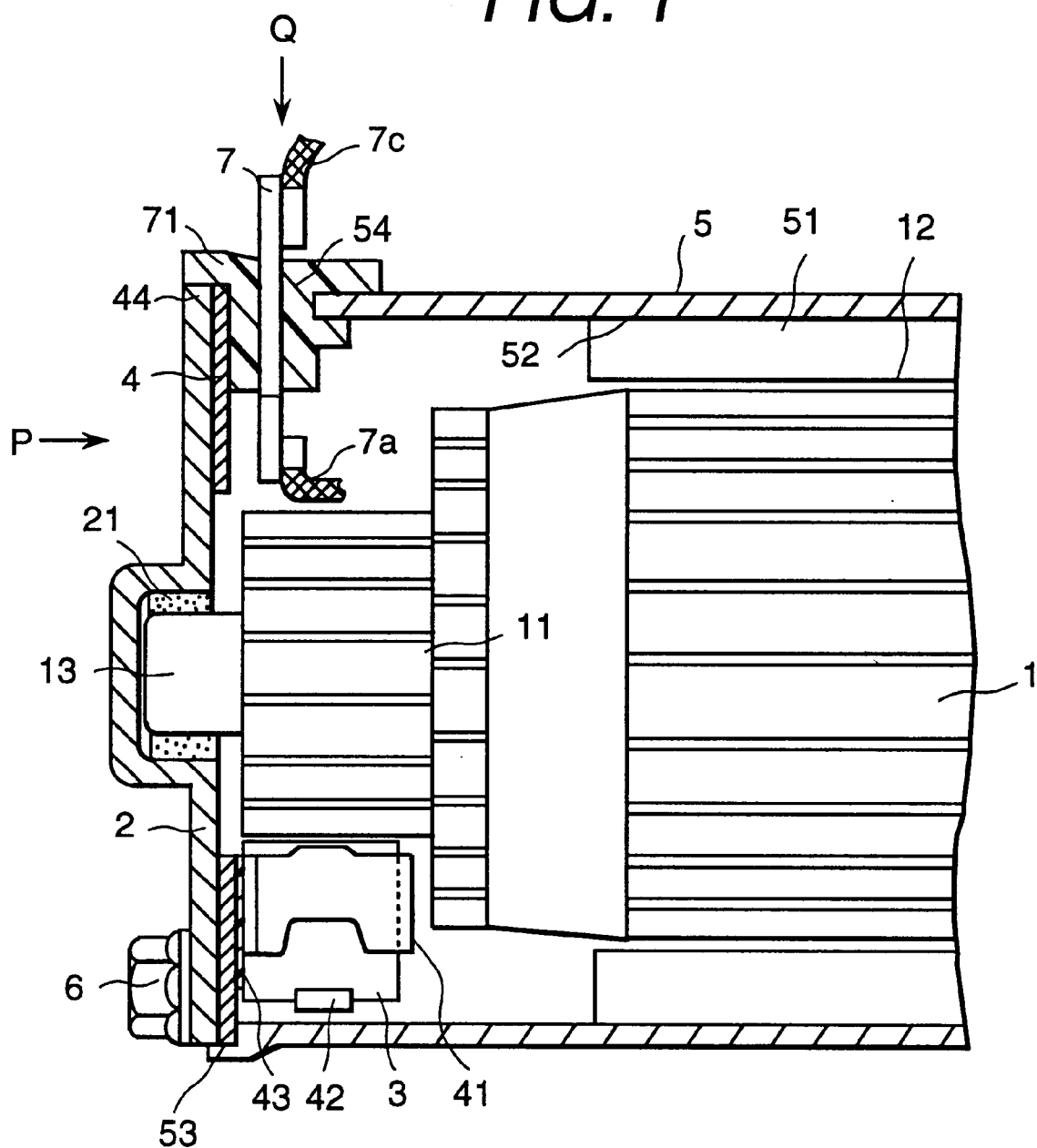
FIG. 1 is a partially cross-sectional view showing one embodiment of a permanent magnetic field starter motor according to the present invention.

FIG. 1 is a partially cross-sectional view showing one embodiment of a permanent magnetic field starter motor according to the present invention. In FIG. 1, a permanent magnetic field starter motor comprises mainly an armature 1 and a rear bracket 2. The armature 1 is constituted of a commutator 11, a magnetic iron core 12 and a shaft 13. The magnetic iron core 12 with a built in an armature coil (not shown in figure) is installed in the vicinity of an outer periphery of the armature 1. The commutator 11 and the magnetic iron core 12 are fixed to the shaft 13. The rear bracket 2 has a bearing member 21 which supports rotatably the shaft 13.

Further, the permanent magnetic field starter motor comprises a brush member 3 which is positioned and aligned in a circumferential direction of a yoke 5 stated in latter. A brush member holder 41 and a brush member spring member 42 are arranged on and press against a disc shaped metal brush member holder plate 4. A plurality of permanent magnets 51 are positioned and aligned in a circumferential direction at an inner peripheral face 52 of a cylindrically shaped iron yoke 5, and a through bolt member 6 assembles the motor components.

Further, a circular shaped penetrating hole is formed at a central portion of the brush member holder plate 4 and the shaft 13 penetrates this penetrating hole and this shaft 13 is supported by the bearing member 21.

Figure 2:
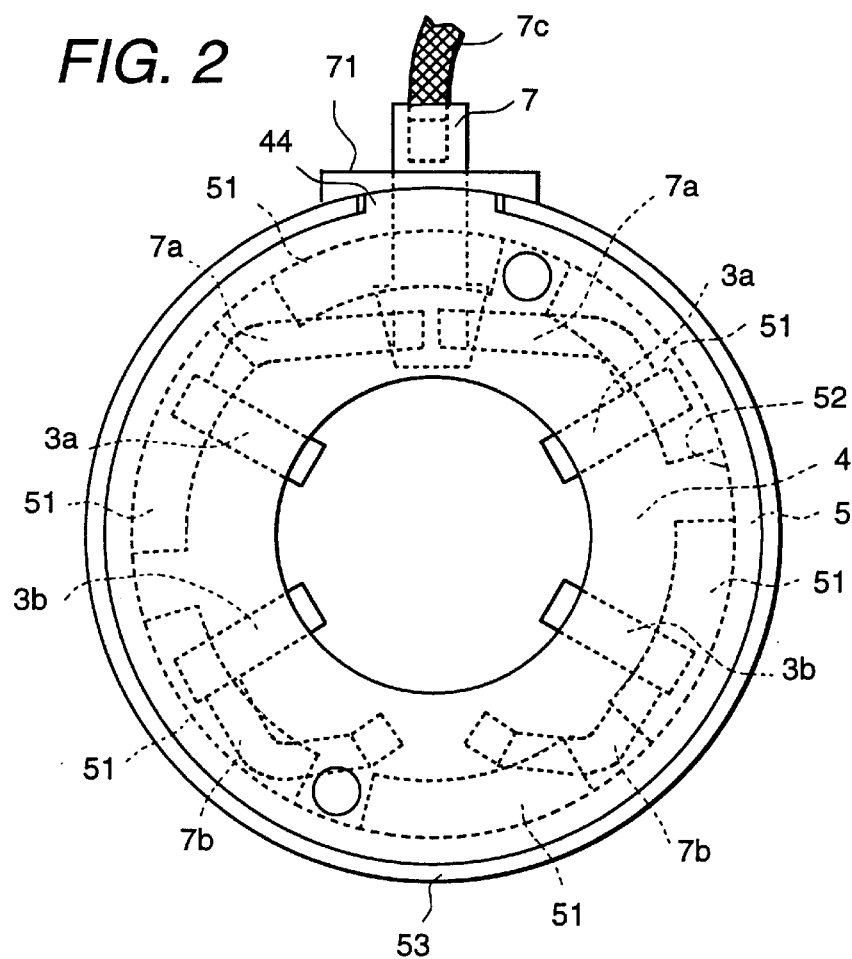
FIG. 2 is a view taken from P direction of one embodiment shown in FIG. 1 in which a rear bracket and an armature are taken away.

FIG. 2 is a view taken from P direction of the permanent magnetic field starter motor shown in FIG. 1, in which the rear bracket 2 and the armature 1 are taken away. In FIG. 2, a plus (+) side brush member 3a is connected electrically to a lead terminal 7 by a lead wire 7a, and is pressed against an outer peripheral face of the commutator 11 by the brush member spring member 42. Further, the plus (+) side brush member 3a, the brush member spring member 42 and the brush member holder 41 at the plus (+) side are insulated electrically to the brush member holder plate 4 by an insulating plate 43.

A minus (−) side brush member 3b is connected electrically to the brush member holder plate 4 by a lead wire 7b, and is pressed against to the outer peripheral face of the commutator 11 by the brush member spring member 42.

The lead terminal 7 is inserted into and supported by an insulation bush member 71 which is comprised of an insulating material such as a rubber member. The lead terminal 7 is connected electrically to a power supply (not shown in figure) by an outside portion lead wire 7c which is connected to the lead terminal 7. The yoke 5, the brush member holder plate 4 and the rear bracket 2 are insulated electrically against the lead terminal 7 by the bush member 71.

When a switch member (not shown in figure) is in an "ON" position, the current flows from the power supply through the outside portion lead wire 7c, the lead terminal 7, the lead wire 7, the plus (+) side brush member 3a, the commutator 11, the armature coil, the commutator 11, the minus side (−) brush member 3b, the lead wire 7b, the brush member holder plate 4, and back to the power supply. As a result, the armature 1 starts to rotate by a magnetomotive force according to a magnetic field of the permanent magnets 51 and a current flowing the armature coil.

Figure 3:
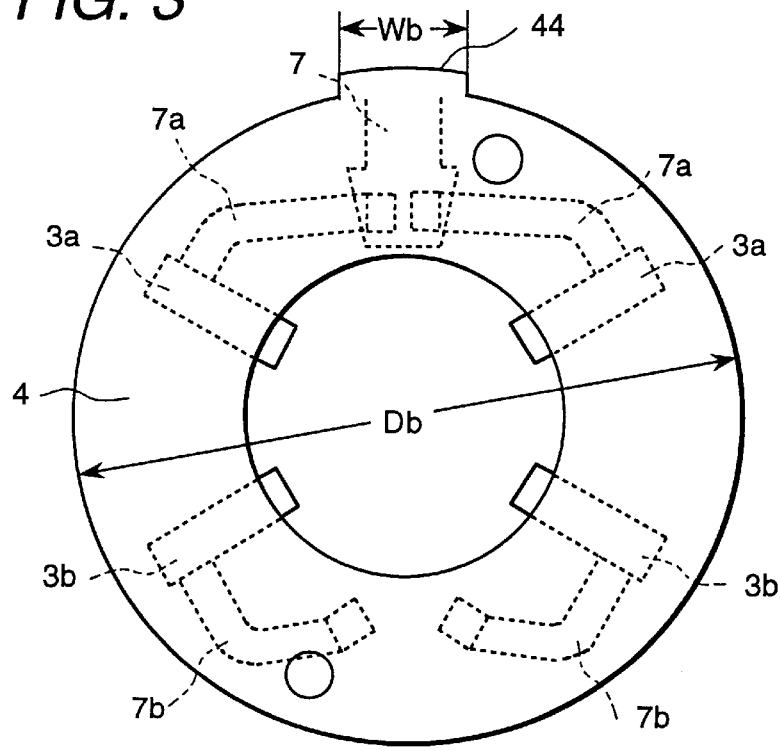
FIG. 3 is a view taken from P direction of one embodiment shown in FIG. 1 from which a part is omitted.
Figure 4:
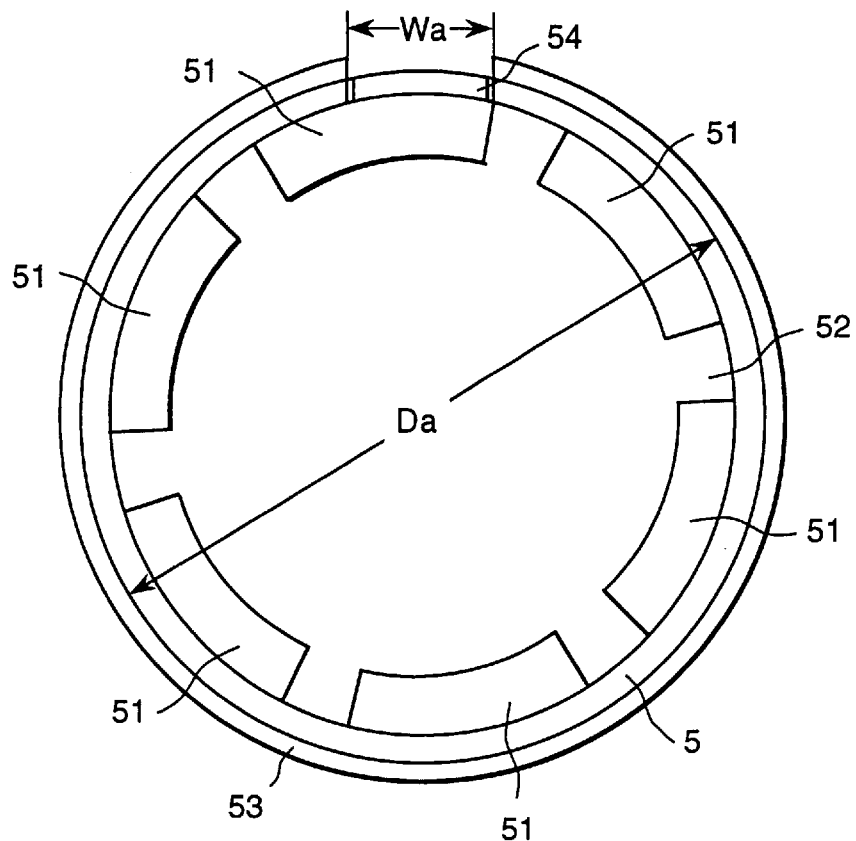
FIG. 4 is a view taken from P direction of one embodiment shown in FIG. 1 with respect to a yoke.
Figure 5:
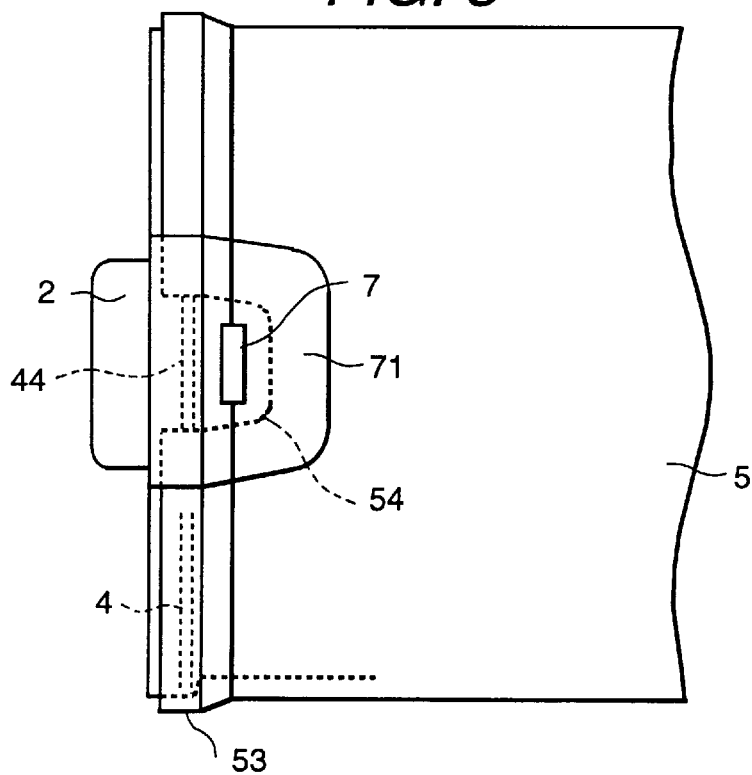
FIG. 5 is a view taken from Q direction of one embodiment shown in FIG. 1.

Next, the features of this embodiment of the permanent magnetic field starter motor according to the present invention will be explained referring to from FIG. 3 to FIG. 5. FIG. 3 is a view taken from P direction of the permanent magnetic field starter motor shown in FIG. 1 similar to FIG. 2. Further, FIG. 4 is a view taken from P direction of the yoke of one embodiment shown in FIG. 1. FIG. 5 is a view taken from Q direction of one embodiment shown in FIG. 1.

In FIG. 3 to FIG. 5, a ring shaped enlarged portion 53 is formed at an end of the yoke 5. This enlarged portion 53 has an inner diameter Da which is larger than that of the yoke 5. The relationship in dimension between the inner diameter Da of the enlarged portion 53 and the outer diameter Db of the brush member holder plate 4 is set at $Da \geq Db$.

Further, the outer diameter Db of the brush member holder plate 4 is larger than the inner diameter of the yoke 5. The brush member holder plate 4 is fitted into or inserted to an inner side of the enlarged portion 53. And a radial position between the yoke 5 and the brush member holder plate 4 is directly positioned and aligned.

Further, a U shaped cut-out or groove 54 is formed on the yoke 5 to receive the bush member 71. As shown in FIG. 5, the U shape of the cut-out groove 54 is defined taking from the yoke 5 from Q direction shown in FIG. 1.

Insertion of the bush member 71 into the cut-out groove 54 determines the position (in a thrust direction) of the outside portion lead wire 7c, the lead terminal 7, and the lead wire 7a, which are arranged so as not to contact the lead yoke 5, the brush member holder plate 4 and the commutator 11.

Further, a projection 44 is formed on the brush member holder plate 4, which projects from the outer periphery having the outer diameter of Db. The dimensional relationship between the width Wb of the projection 44 at of the outer periphery of the brush member holder plate 4, and the width Wa of the cut-out groove 54 in tangential direction of the yoke 5, is set such that $Wa \geq Wb$.

By insertion of the projection 44 into the cut-out groove 54, the circumferential position between the yoke 5 and the brush member holder plate 4 is directly aligned.

The rear bracket 2 is installed to the yoke 5 by intervening the brush member holder plate 4, and supports the shaft 13 by the bearing member 21. In this case, with respect to the rear bracket 2, alignment between the rear bracket 2 and the yoke 5 becomes unnecessary.

According to the above stated embodiment of the permanent magnetic field starter motor of the present invention, the enlarged portion 53 is formed on the end portion of the yoke 5. Also the dimensional relationship between the outer diameter Wb of the disc shaped brush member holder plate 4 (to which the brush member 3 is arranged) and the diameter Wa of the inner peripheral circle of the enlarged portion 53 is set so that $Wa \geq Wb$.

Accordingly, the brush member holder plate 4 is inserted into the inner side of the enlarged portion 53, and radial alignment between the yoke 5 and the brush member holder plate 4 is carried out directly.

With the above stated structure, in this embodiment of the permanent magnetic field starter motor according to the present invention as shown, arrangement of the permanent magnets 51 and the brush member 3 at a predetermined position (by mutual alignment of permanent magnets 51 and the yoke 5; the yoke 5 and the brush member holder plate 4; and the brush member holder plate 4 and the brush member 3) requires only two components (the yoke 5 and the brush member holder plate 4) in addition to the permanent magnets 51 and the brush member 3, and only three positioning alignments.

In the conventional permanent magnetic field starter motor, as stated in above, arrangement of the permanent magnets and the brush member at a predetermined position requires three additional components and four positioning alignments. In comparison with the conventional permanent magnetic field starter motor, in the permanent magnetic field starter motor according to the present invention, one positioning alignment manner is omitted.

Accordingly, the in positioning alignment between the permanent magnets 51 and the brush member 3 can be reduced. Also, the accuracy of the radial positioning alignment between the permanent magnets 51 and the brush member 3 can be improved.

Further, the dimensional relationship between the width Wa of the cut-out groove 54 necessary for exit of the lead terminal 7 and the width Wb of the projection 44 is set so that Wa≧Wb. The projection 44 is inserted into the cut-out groove 54, and further the radial alignment between the yoke 5 and the brush member holder plate 4 is carried out easily and accurately.

Thus, without increasing the manufacturing cost of the permanent magnetic field starter motor, the positioning alignment accuracy between the permanent magnets 51 and the brush member 3 can be improved.

Further, in the above stated embodiment of the permanent magnetic field starter motor according to the present invention, the ring shaped enlarged portion 53 is formed on the end portion of the yoke 5, and has an inner diameter Wa which is larger than that of the yoke 5.

However, as the enlarged portion 53, on the inner peripheral face of the end portion of the yoke 5, a ring shaped projecting portion can be formed, such a projection has a smaller inner peripheral diameter than the inner peripheral diameter of the yoke 5. In this case, the outer diameter Wb of the brush member holder plate 4 is smaller than the inner peripheral diameter of the yoke 5, but is larger than the inner peripheral diameter of the ring shaped projecting portion.

Since the permanent magnetic field starter motor according to the present invention is constituted with the above stated structure, following effects can be obtained.

Since the brush member holder plate is arranged directly at the inner side of the enlarged portion which is formed to the end portion of the yoke and further since the projection of the brush member holder plate is inserted into the cut-out groove of the yoke, accordingly the positioning alignment accuracy between the permanent magnets and the brush member is improved in both the circumferential and radial direction.

As a result, without rise in the manufacturing cost, the permanent magnetic field starter motor improves the positioning alignment accuracy between the permanent magnets and the brush member.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A permanent magnetic field starter motor comprising:
   a cylindrical shaped yoke having a central portion and end portions at opposite axial extremities thereof;
   a plurality of permanent magnets aligned and arranged at an inner peripheral face of the central portion of the cylindrical shaped yoke;
   a disc shaped brush member holder plate having a radially extending projection at a periphery thereof; and
   plus and minus side brush members arranged on the disc shaped brush member holder plate; wherein
   an enlarged portion is formed at a first end portion of the yoke said enlarged portion having an inner diameter which is larger than an inner diameter of said central portion and larger than an outer diameter of the brush member holder plate;
   a cut-out groove is formed at the first end portion of the yokes;
   the brush member holder plate has an outer diameter which is larger than the inner diameter of the central body, and is arranged at an inner periphery of the enlarged portion, with the projection of the brush member holder plate inserted into the cut-out groove;
   whereby the permanent magnets and the brush member are aligned both radially and circumferentially.

2. A permanent magnetic field starter motor according to claim 1 wherein a width Wa of the cut-out groove is greater than or equal to a width Wb of the projection.

3. A permanent magnetic field starter motor according to claim 1 wherein:
   at a central portion of the brush member holder plate, a penetrating hole is formed, to which penetrating hole a rotative shaft of an armature is inserted; and
   a rear bracket is provided, which has a bearing member for supporting rotatably the rotatable shaft which is inserted into the penetrating hole and is installed to the end portion of the yoke by intervening the brush member holder plate.

4. The starter motor according to claim 1, wherein said radially extending projection is formed as an integral feature of the brush member holder plate, and projects from inside said enlarged portion to an outside thereof.

5. The starter motor according to claim 1, wherein the radially extending projection forms an integral part of the brush member holder plate.

6. A permanent magnetic field starter motor comprising:
   a cylindrical shaped yoke;
   a plurality of permanent magnets aligned and arranged at an inner peripheral face of the cylindrical shaped yoke;
   a disc shaped brush member holder plate; and
   plus and minus side brush members arranged on the disc shaped brush member holder slate; wherein
   at an end portion of the yoke adjacent of the brush member holder plate, an enlarged portion is formed, said enlarged portion having an inner diameter which is larger than an outer diameter of the brush member holder plate;
   at the end portion of the yoke adjacent of the brush member holder plate, a cut-out groove is formed;
   a projection for projecting toward a radial direction is formed on the brush member holder plate;
   the brush member holder plate is arranged at an inner periphery of the enlarged portion; and
   the projection of the brush member holder plate is inserted into the cut-out groove, whereby the permanent magnets and the brush member are aligned circumferentially; and wherein
   the permanent magnets and the brush member are aligned radially; and
   a lead wire of the plus side brush member is arranged in the cut-out groove.

* * * * *